United States Patent [19]

Gomez

[11] Patent Number: 5,212,615

[45] Date of Patent: May 18, 1993

[54] DATA STORAGE DEVICE HAVING STRETCHED AND DISTENDED MAGNETIC MEDIA SURFACE

[76] Inventor: Ramon S. Gomez, P.O. Box 361, Cottage Grove, Minn. 55016

[21] Appl. No.: 759,404

[22] Filed: Sep. 13, 1991

[51] Int. Cl.[5] .......................... G11B 5/82; G11B 5/76
[52] U.S. Cl. ..................................... 360/135; 360/136
[58] Field of Search ............. 360/135, 136, 131, 100.1

[56] References Cited

U.S. PATENT DOCUMENTS

| Re. 33,187 | 3/1990 | Alexander | 360/135 |
| 3,805,292 | 4/1974 | Hashiguchi | 360/135 |
| 4,604,667 | 8/1986 | Kinjo | 360/100.1 |
| 4,623,570 | 11/1986 | Alexander | 360/135 |
| 4,631,609 | 12/1986 | Erickson | 360/135 |
| 4,633,357 | 12/1986 | Kinjo | 360/136 |
| 4,742,421 | 5/1988 | Seto | 360/135 |
| 4,887,178 | 12/1989 | McCracken | 360/135 |

Primary Examiner—Bruce C. Anderson
Attorney, Agent, or Firm—Haugen and Nikolai

[57] ABSTRACT

A data storage device having two distended and stretched magnetic media surfaces. The magnetic media has a backing which is distended when secured to a core body of the device. A shell surrounds the core body to further stretch the backing resulting in a flat and smooth surface. The flat and smooth surface of the backing is metal coated to form the magnetic media. The shell contains a metallic raceway which serves as a drive locator.

16 Claims, 1 Drawing Sheet

DATA STORAGE DEVICE HAVING STRETCHED AND DISTENDED MAGNETIC MEDIA SURFACE

FIELD OF THE INVENTION

This invention relates to a data storage device and, more particularly, to a storage device containing a plated primed media on each end which is distended and stretched resulting in a flatter and smoother magnetic media surface than heretofore achieved.

BACKGROUND OF THE INVENTION

Date storage units have a magnetic media on which data is written, stored and read. A read/write head of the disk drive unit flies in close, but non-contact relation with respect to the magnetic medium to write or read stored data. A smooth and flat magnetic medium surface allows the read/write head to fly closer to the magnetic medium. Consequently, the density of the data that can be recorded and read from the medium can be higher.

Stretched magnetic mediums are known in the prior art. It is known to stretch a medium over a ring or bowl shape base and secure it with an outer ring. However, such mediums have been limited by having only one storage side and cannot compete with the higher density disks. Furthermore, such mediums have had difficulties with surface defects, often resulting in head crashes.

Therefore, what is needed is a stretched medium that is comparable to a high density conventional data storage disk, specifically, a two-sided storage device utilizing a stretched medium with minimal defects and a substantially smooth and flat surface.

OBJECTS

The primary object of the invention is to provide a two-sided stretched magnetic media data storage device that allows a read/write head to fly closer to the surface.

Another object is to have a smooth and flat magnetic medium surface by stretching and distending the media.

It is yet another object of the invention to increase the head access to denser data stored on the device.

Still another object of the invention is to provide more data storage on a smaller disk.

SUMMARY OF THE INVENTION

The present invention is a two-sided data storage device. The device comprises a tubular body having a series of longitudinally spaced annular recesses and rounded opposed end edges. Two primed polyester circular cutouts serve as the magnetic medium backing. The peripheral edge of the circular cutouts are notched in such a way that when folded back against the outer peripheral surface of the tubular body the notched portion of the cut outs lie flat. The more particularly, the cutouts are placed over each end of the tubular body where the central portions thereof are distended and stretched to ensure a flat and smooth surface. The notched edges of the backer and rounded edges of the tubular body further promote the flat smoother surface. The notched edges extend over the annular recesses of the tubular body. An adhesive or heat sealable polyester is used to attach the cutouts to the tubular body wall.

A two-section tubular shell interlocks and surrounds the tubular body. It has internal ribs which mate with the annular recesses of the tubular body. In mating, the shell sections further secure, stretch and distend the circular ends of the polyester cutouts to further smooth and flatten the surface. Lastly, the shell sections have an annular ridge on their exterior surface which is covered by a metallic ring which serves as a raceway. The raceway acts as a locator for the drive with which the media of the present invention is used to rotate the data storage device and to locate the desired media section on which data is to be read or written.

Other features, objects, uses and advantages of this invention are further explained and they would be better understood by reference to the drawings which form a further part of the disclosure and to the accompanying descriptive matter in which there is described in more detail a preferred embodiment of the invention.

DESCRIPTION OF THE PREFERRED EMBODIMENT

Figure 1:
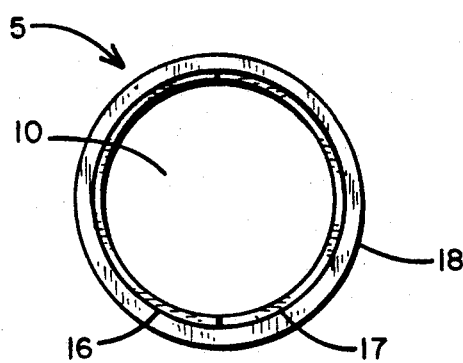
FIG. 1 is a front end view of the data storage device of the present invention.
Figure 2:
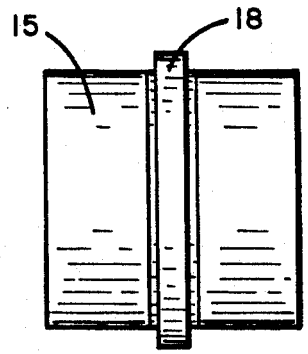
FIG. 2 is a side view of the invention when assembled.

As shown in FIGS. 1 and 2, there is depicted the invention, namely, a stretched magnetic media surface data storage device 5. The device 5 has a generally cylindrical shape with a primed polyester surface which is plated forming magnetic media 10, a two-piece shell 15 having a first and second section, 16 and 17, which covers a tubular core body and a smooth raceway 18 formed by a metal band.

Figure 3:
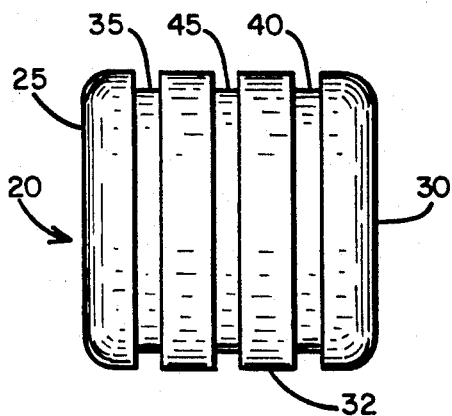
FIG. 3 is a side-view of the tubular body portion of the data storage device.

The core body 20 is shown in FIG. 3. It has a tubular shape with first and second ends, 25 and 30, and a side wall 32 extending therebetween. These ends have rounded edges as shown. Annular recesses 35 and 40 encircle the entire core body 20. Interlocking recess 45 is also located on the core body 20 midway between the recesses 35 and 40. The core body 20 is preferably molded from a hard thermoplastic. The depth of the recesses 35, 40 and 45 will be dependent upon the caliper of the magnetic media's primed polyester backing and the desired amount of stretching.

Figure 4:
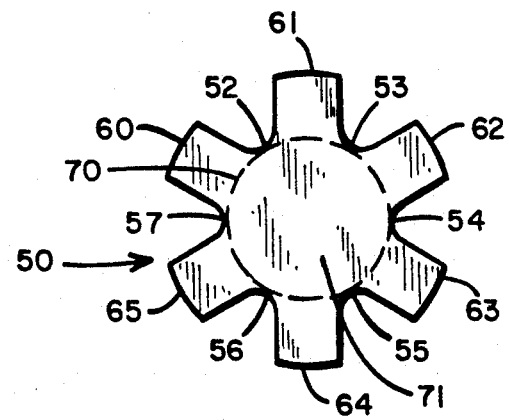
FIG. 4 is a view of the magnetic surface backing prior to being stretched over the tubular body of FIG. 3.

FIG. 4 shows the magnetic media backing layer 50 prior to the assembly of the device 5. The circular backing layer 50 is cut preferably from a polyester roll material. This material is preferably primed in a coater head type of coater prior to cutting. The caliper and width of the polyester roll material will depend upon the size of the data storage unit. The backing layer 50 is notched with the notches having circulate center sections at 52-57, creating a plurality of flanges or tabs 60-65. The notches extend to a diameter slightly larger than the diameter of the ends of the tubular core body 25 and 30. The portion of the backing within this diameter forms a circular surface 71.

Figure 5:
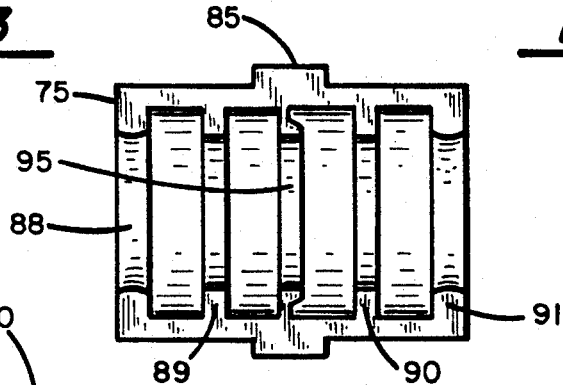
FIG. 5 is a view of the interior of a semi-circular shell section used to surround the tubular body portion.

Turning now to the two semi-circular sections of the shell 16 and 17, one of which is shown in FIG. 5, each shell section is preferably molded from a hard thermoplastic and is identical in structure. An exterior ridge 85 encircles the outside surface of the interlocked shell sections. A metallic band 18 is formed over the ridge 85 to form a raceway. The interior of each shell section contains ridges 89 and 90 which are designed to mate with the annular recesses 35 and 40 on the tubular body. The interior surface of the shell halves also contain an interlocking ridge 95. This interlocking ridge 95 is designed to be force-fit into the interlocking recess 45 of the tubular core member 20. The ribs 88 and 91 are rounded as shown.

The storage device is assembled by first distending a media backing layer 50 over each end 25 and 30 of the core body 20. The tabs or flanges 60–65 are folded over onto the side wall 32 of the core body 20. The flanges 60–65 extend over and beyond the annular recesses 35 and 40. The rounded edges of the core body 20 and the notches serve to eliminate wrinkling of the media surface. The folded portions of the backing layers are attached to the side wall 32 of the tubular core body. Preferably, the backing material is heat-sealable and the backing layer 50 is attached by applying heat. An alternative attachment means would be to apply an adhesive to the core body 20 before the backing edges are folded over. If an adhesive is used, it should not flake or migrate towards the surface. The flanges must be secure with uniform tension and any slack present on the surfaces 71 should be removed during the securing process.

Figure 6:
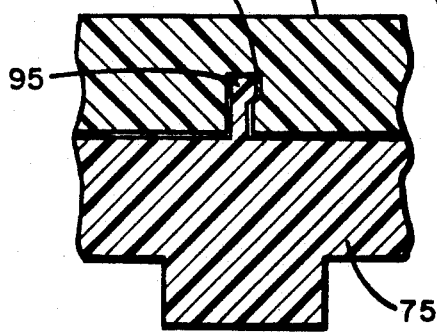
FIG. 6 is a partial cut-away view showing the locking mechanism of the shell to the tubular body.

The two semi-circular shell sections 16 and 17 are now placed around the core body 20. The sections 16 and 17 push the flanges 60–65 into the annular recesses, further stretching the backing and making surface 71 flat and smooth. The rounded side ribs 88 and 90 cover any wrinkling of the backing 50. They also operate to press any wrinkles against the side wall 32. The two shell sections 16 and 17 lock by force fitting the locking ridge 95 into interlocking recess 45. FIG. 6 shows the locking arrangement.

Figure 7:
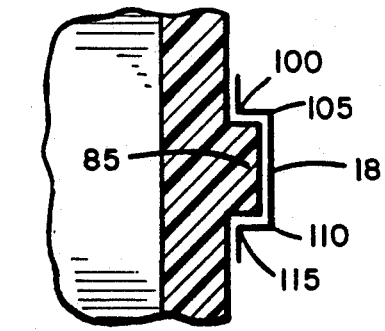
FIG. 7 is a partial cut-away showing the metallic band forming the raceway.

The metallic band 18 is now placed over the annular ridge 85 to operate as a raceway as shown in FIG. 7. To ensure a smooth raceway, the metallic band 18 is preferably assembled by first starting with a non-folded band and sequentially folding corners 100, 105, 110 and 115 to form the bent raceway. The raceway will serve as a locator for the drive to rotate the device 5 when finding the desired media section to read or write data. Upon completion of the assembly, the exposed circular ends of the backing layers can be plated to form the magnetic media surface 10. Chemical plating, vacuum deposition or sputtering are well known ways of applying the magnetic material as a coating to a substrate surface.

It is to be understood that the above disclosure of the presently preferred embodiment of the invention is to be taken as illustrative of the invention. Furthermore, it is to be understood that those skilled in the art be capable of making modifications without departing from the true spirit and scope of the invention.

What is claimed is:

1. A stretched magnetic media surface data storage device comprising:
   (a) a core body having a first and second end;
   (b) a first magnetic media distended over said first end and secured to said core body;
   (c) a second magnetic media distended over said second end and secured to said core body;
   (d) means connected to said core body for stretching said first and second magnetic media;
   (e) a data unit raceway surrounding said means for stretching.

2. The data storage device of claim 1, wherein said means for stretching comprises a shell having first and second interlocking sections, a plurality of inwardly projecting ribs and an exterior ridge on each of said sections.

3. The data storage device of claim 2, wherein said first and second ends of said core body have rounded edges and said core body further includes a plurality of annular recesses for receiving said plurality of inner ribs of said means for stretching.

4. The data storage device of claim 1, wherein said data unit raceway comprises a smooth metallic band supported by said exterior ridge.

5. The data storage device of claim 4, wherein said magnetic media is primed, metal coated and heat sealable polyester film material.

6. The data storage device of claim 5 wherein said magnetic media is secured to said tubular body by heat sealing.

7. The data storage device of claim 1, wherein said core body and first and second shell sections are made of a hard thermoplastic.

8. The data storage device of claim 1, wherein said magnetic media is a primed, metal coated and, heat sealable polyester film material.

9. The data storage device of claim 6 wherein said magnetic media is secured to said core body by heat sealing.

10. The data storage device of claim 1 wherein said media is secured to said core body by an adhesive.

11. A stretched magnetic media surface data storage device comprising:
   (a) a tubular body having a first and second end;
   (b) a first magnetic media distended over said first end and secured to said tubular body;
   (c) a second magnetic media distended over said second end and secured to said tubular body;
   (d) means connected to said tubular body for stretching said first and second magnetic media; and
   (e) a data unit raceway surrounding said means for stretching.

12. The data storage device of claim 11, wherein said means for stretching and distending comprises a tubular shell having first and second semi-circular interlocking sections, a plurality of innerwardly projecting ribs and an exterior annular ridge on each of said sections.

13. The data storage device of claim 12, wherein said first and second ends of said tubular body have rounded edges and said tubular body further having a plurality of annular recesses for receiving said plurality of inner ribs of said means for stretching.

14. The data storage device of claim 12, wherein said data unit raceway comprises a smooth metallic ring supported by said exterior annular ridge.

15. The data storage device of claim 11, wherein said core body and said first and second shell sections are made of a hard thermoplastic.

16. The data storage device of claim 11 wherein said magnetic media is secured to said tubular body by an adhesive.

* * * * *